United States Patent
Cheng et al.

(10) Patent No.: US 11,360,556 B2
(45) Date of Patent: Jun. 14, 2022

(54) DISPLAY DEVICE AND DISPLAY DRIVING METHOD FOR A DISPLAY PANEL

(71) Applicants: Wuhan Tianma Micro-Electronics Co., Ltd., Wuhan (CN); Wuhan Tianma Microelectronics Co., Ltd. Shanghai Branch, Shanghai (CN)

(72) Inventors: Shuang Cheng, Shanghai (CN); Jinghua Niu, Shanghai (CN); Mingzhi Dai, Shanghai (CN); Yinhe Liu, Shanghai (CN); Yuhao Liu, Shanghai (CN); Zhi Zhang, Shanghai (CN); Jianyun Wang, Shanghai (CN)

(73) Assignees: WUHAN TIANMA MICRO-ELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 16/896,026

(22) Filed: Jun. 8, 2020

(65) Prior Publication Data
US 2020/0301505 A1 Sep. 24, 2020

(30) Foreign Application Priority Data
Nov. 28, 2019 (CN) .......................... 201911195370.4

(51) Int. Cl.
*G06F 3/01* (2006.01)
*G09G 5/37* (2006.01)

(52) U.S. Cl.
CPC ............... *G06F 3/013* (2013.01); *G09G 5/37* (2013.01); *G09G 2320/08* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2017/0090562 A1* | 3/2017 | Gustafsson | G06K 9/00604 |
| 2017/0316601 A1* | 11/2017 | Kakarlapudi | G06T 15/005 |
| 2018/0224935 A1* | 8/2018 | Thunstrom | G09G 3/003 |
| 2020/0051207 A1* | 2/2020 | Ogasawara | G06T 3/40 |

FOREIGN PATENT DOCUMENTS

| | | | |
|---|---|---|---|
| CN | 105720074 A | * | 6/2016 |
| CN | 105720074 A | | 6/2016 |

* cited by examiner

*Primary Examiner* — Yi Wang
(74) *Attorney, Agent, or Firm* — Alston & Bird LLP

(57) ABSTRACT

A display device includes an eyeball tracking inductor, a display panel and a processor, where the processor is electrically connected to the eyeball tracking inductor and the display panel separately; the eyeball tracking inductor is configured to identify user eyeball image information; the processor is configured to determine a gaze region and a split view region of a user viewing the display panel, according to the user eyeball image information, control the gaze region to be displayed at a first resolution, and control the split vision region of the display panel to be displayed at a second resolution, where the first resolution is greater than the second resolution.

14 Claims, 5 Drawing Sheets

DISPLAY DEVICE AND DISPLAY DRIVING METHOD FOR A DISPLAY PANEL

CROSS-REFERENCES TO RELATED APPLICATIONS

This application claims the priority to Chinese Patent Application No. CN201911195370.4, filed on Nov. 28, 2019, the disclosure of which is incorporated herein by reference in its entirety.

TECHNICAL FIELD

The present disclosure relates to the field of display technologies and, in particular, to a display device and a display driving method for a display panel.

BACKGROUND

A virtual reality technology uses computer technologies to fuse and reconstruct various kinds of information such as vision, hearing and touch, thus generating a human-computer interactive virtual scene. A user can obtain an immersive experience through real-time dynamic three-dimensional images displayed by a virtual reality (VR) apparatus.

An organic light emitting diode (OLED) panel is currently used in main displays for VR devices. The OLED has the characteristics of bright colors and low delay time in display, thus it avoids the problem of moving images from an after-image phenomenon to occur. Generally, the VR display will magnify an image on the display panel such that pixels observed by human eyes become larger than real objects, and a spacing between pixels becomes larger, so a picture viewed by the user will have an effect of being covered by a screen door, also known as a screen-door effect, therefore, a resolution of a practically observed pixel becomes lower, resulting in a worse display effect.

SUMMARY

The present disclosure provides a display device and a display driving method for a display panel to achieve a high-resolution display of a gaze region viewed by a user and improve a display effect.

In a first aspect, an embodiment of the present disclosure provides display device. The display device includes an eyeball tracking inductor, a display panel and a processor, where the processor is electrically connected to the eyeball tracking inductor and the display panel separately. The eyeball tracking inductor is configured to identify user eyeball image information. The processor is configured to determine, according to the user eyeball image information, a gaze region of a user viewing the display panel, control the gaze region to be displayed at a first resolution, and control a split vision region of the display panel to be displayed at a second resolution. The first resolution is greater than the second resolution.

In a second aspect, an embodiment of the present disclosure further provides a display driving method for a display panel. The method includes steps described as: user eyeball image information is acquired. A gaze region of a user viewing the display panel is determined according to the user eyeball image information. The gaze region is controlled to be displayed at a first resolution, and a split vision region of the display panel is controlled to be displayed at a second resolution. The first resolution is greater than the second resolution.

In some examples, the processor is electrically connected to the eyeball tracking inductor and the display panel separately, the eyeball tracking inductor is configured to identify the user eyeball image information, and the processor is configured to determine, according to the user eyeball image information, the gaze region of the user viewing the display panel, control the gaze region to be displayed at the first resolution, and control the split vision region of the display panel to be displayed at the second resolution, where the first resolution is greater than the second resolution.

In this way, the problems that a resolution of an existing display device is not high enough and power consumption and calculation energy are large when a high-resolution display panel is used are solved, a high-resolution display of the gaze region viewed by the user is achieved, the display effect is improved, a high-resolution viewing requirement from the user is satisfied, and meanwhile the power consumption and the calculation energy of the whole display panel are reduced and costs are saved.

DETAILED DESCRIPTION

Figure 1:
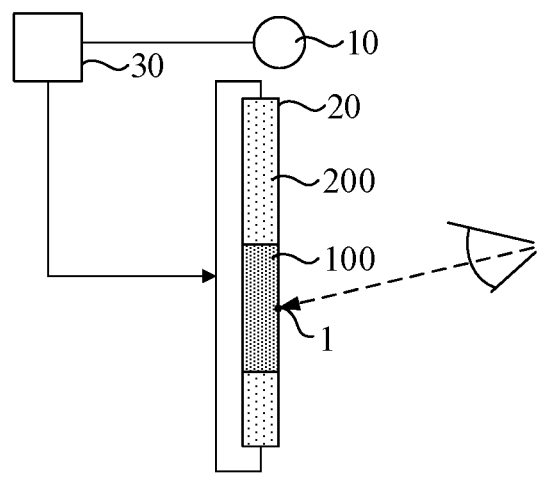
FIG. 1 is a structural diagram of a display device according to an embodiment of the present disclosure.

Hereinafter the present disclosure will be further described in detail in conjunction with the drawings and embodiments. It is to be understood that the specific embodiments set forth herein are merely intended to illustrate and not to limit the present disclosure. Additionally, it is to be noted that for ease of description, merely part, not all, of the structures related to the present disclosure are illustrated in the drawings.

Figure 2:
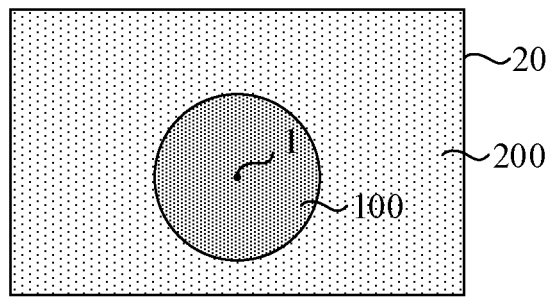
FIG. 2 is a schematic diagram of a display effect on the display panel shown in FIG. 1.

As described in the background, an existing VR display device is generally provided with a magnifier in front of a display panel so as to magnify a display picture and provide a user with a better immersive experience. However, although a resolution of a current display panel can already satisfy a normal display requirement, there is still the problem that the resolution is not high enough. In addition, in the case where the display picture is magnified, the resolution of the display picture will be reduced, and the spacing between pixels is also magnified, so that the display picture has a "screen-door effect", resulting in a worse display effect. Moreover, the resolution of the display panel is improved to ensure that the resolution of the picture in a magnified state satisfies the requirement, which will increase costs, power consumption and calculation energy of the display panel. Based on this, an embodiment of the present disclosure provides a display device. FIG. 1 is a structural diagram of a display device according to an embodiment of the present disclosure. FIG. 2 is a schematic diagram of a display effect of the display panel shown in FIG. 1. Referring to FIG. 1 and FIG. 2, the display device includes an eyeball tracking inductor 10, a display panel 20 and a processor 30. The processor 30 is electrically connected to the eyeball tracking inductor 10 and the display panel 20 separately. The eyeball tracking inductor 10 is configured to identify user eyeball image information. The processor 30 is configured to determine, according to the user eyeball image information, a gaze region 100 of a user viewing the display panel 20, control the gaze region 100 to be displayed at a first resolution, and control a split vision region 200 of the display panel 20 to be displayed at a second resolution. The first resolution is greater than the second resolution.

The gaze region 100 refers to a region where the user focuses his attention or a region where a line of sight falls when the user views the display panel 20. A size and a shape of the region are not fixed and may be preset artificially or determined by the user. A region in the display panel 20 other than the gaze region 100 is the split vision region 200, that is, a region where the user views the display panel 20 with lower attention. The display panel 20 may implement displays at a normal resolution and a higher resolution, where the first resolution is the higher resolution, and the second resolution is the normal resolution. The eyeball tracking inductor 10 is disposed on a side opposite to eyeballs of the user, and may be generally disposed at a periphery position of the display panel 20, as shown in the figure, above the display panel 20. It is to be noted that the eyeball tracking inductor 10 may include not only one induction components to ensure the collection of eyeball image information from various directions and the accuracy of the eyeball image information.

The eyeball tracking inductor 10 collects images of the user's eyes or eyeballs in real time, that is, acquires the user eyeball image information. The eyeball image information mainly includes eyeball movement position information to represent a direction of the line of sight or a position of a point of sight. In one aspect, the processor 30 is configured to receive the eyeball image information sent by the eyeball tracking inductor 10 in real time, and determine, according to spatial structure information such as the user eyeball image information, user eye position information, and a structure of the display device, the gaze region 100 when the user views the display panel 20 by a preset algorithm. In the other aspect, the processor 30 needs to drive and control an image display of the display panel 20 in real time. After determining the gaze region 100, the processor 30 sends a display instruction to the display panel 20 such that the gaze region 100 of the display panel 20 is displayed at the first resolution, that is, the higher resolution, and the split vision region 200 is displayed at the second resolution, that is, the normal resolution. At this time, a resolution of the gaze region 100 viewed by the user is greater than a resolution of the split vision region 200, thereby satisfying a high-resolution viewing requirement of the user and eliminating the screen-door effect. Meanwhile, the split vision region 200 is displayed at the normal resolution, which facilitates the reduction of the power consumption and the calculation energy of the whole display panel.

The display device provided by the embodiment of the present disclosure is provided with the eyeball tracking inductor, the display panel and the processor, where the processor is electrically connected to the eyeball tracking inductor and the display panel separately. The eyeball tracking inductor is configured to identify the user eyeball image information. The processor is configured to determine, according to the user eyeball image information, the gaze region of the user viewing the display panel, control the gaze region to be displayed at the first resolution, and control the split vision region of the display panel to be displayed at the second resolution, where the first resolution is greater than the second resolution. In this way, the problems that a resolution of the existing display device is not high enough and the power consumption and the calculation energy are large when the high-resolution display panel is used are solved, the high-resolution display of the gaze region viewed by the user is achieved, the display effect is improved, the high-resolution viewing requirement of the user is satisfied, and meanwhile the power consumption and the calculation energy of the whole display panel are reduced and costs are saved.

In the display device described above, after the eyeball tracking inductor identifies the user eyeball image information, the processor is configured to analyze and determine, according to the used eyeball image information, a region gazed by the user by using a preset rule. In view of this, embodiments of the present disclosure provide several ways for determining the gaze region.

Still referring to FIG. 2, the processor 30 is configured to determine, according to the user eyeball image information, a position of a gaze point 1 of the user viewing the display panel 20, and determine, according to the position of the gaze point 1 of the user viewing the display panel 20, the gaze region 100 of the display panel 20; where the position of the gaze point 1 of the user viewing the display panel 20 is a center of the gaze region 100.

The gaze point 1 is a point of the display panel 20 where the line of sight of the user eyes falls. Before determining the gaze region 100, the processor 30 needs to determine, according to the user eyeball image information, known positions of the eyes and a structure parameters of the display device, a point of sight of the display panel corresponding to the user's eyeballs, that is, calculate the point of the display panel where the line of sight of the eyes falls according to a geometric relationship through a viewing angle of the eyes. This process needs the positions of the user eyes and a geometric relationship between the eyes and the display panel to be inputted in advance. After the gaze point 1 is determined, the processor 30 controls and drives the gaze region 100 to be displayed according to the shape and the size of the gaze region 100 preset and stored in the processor 30 by taking the gaze point 1 as the center. Apparently, the shape and the size of the gaze region 100 which is preset and stored need to satisfy the high-resolution viewing requirement of the user, and the size of the gaze region 100 should cover the region where the user focuses the attention, to avoid an insufficient display resolution of the region and avoid the influence on the display effect.

Furthermore, it is necessary to ensure that the gaze region covers the region where the user focuses the attention, but a region where each user focuses attention may vary from person to person. For example, when some users focus attention on a larger region and a small gaze region is displayed at the higher resolution, the high-resolution viewing requirement of these users cannot be satisfied. Therefore, the embodiment of the present disclosure further provides a display device based on the above-mentioned embodiment. Still referring to FIG. 1 and FIG. 2, in the display device, the processor 30 is further configured to acquire setting parameters of the gaze region, and determine, according to the position of the gaze point 1 of the user viewing the display panel 20 and the setting parameters of the gaze region, the shape and the size of the gaze region.

The setting parameters of the gaze region refers to parameters such as the shape and the size of the gaze region, and on a basis that the gaze point 1 is the center, the gaze region 100 may be determined according to the setting parameters of the gaze region. Exemplarily, when the gaze region 100 is determined, for example, the shape parameter in the setting parameters of the gaze region is a circle, and the size is a distance R from an edge of the gaze region 100 to the gaze point 1, so the gaze region 100 may be determined to be a circular region with a radius of R and the gaze point 1 as the center. Of course, the circular gaze region 100 is merely an example, and the user may select the shape parameter according to several preset shape parameter options to satisfy the high-resolution viewing requirement of the user. The shape parameter options may be the circle, a rectangle, a rhombus or the like. Similarly, several options may also be set for a size parameter of the gaze region 100 for the user to select and set the size parameter. At this time, a process in which the processor 30 acquires an option selection instruction of the user is essentially a process of acquiring the setting parameters of the gaze region of the user.

It is to be noted that in the display device provided by the above-mentioned embodiment, a mode for determining the gaze region by the processor is determining, according to a preset and stored parameters of the gaze region or a parameter of the gaze region set by the user, the shape and the size of the gaze region on the basis that the gaze point is determined. The two modes are not contradictory, and the processor may be provided with a function for simultaneously storing the preset parameters of the gaze region and acquiring the parameters of the gaze region set by the user. In this way, it is ensured that the display device is suitable for viewing experiences of various users, and it is convenient for the user to perform adaptive adjustments.

Figure 3:
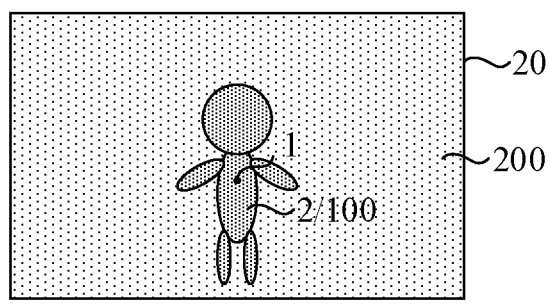
FIG. 3 is a schematic diagram of another display effect on a display panel according to an embodiment of the present disclosure.

In the above-mentioned display device, the processor merely considers the influence of the size and the shape of the gaze region on the display effect when determining the gaze region, but in a practical display process, whether the user has a good viewing experience further depends on a display effect of an image unit in the display picture. Based on this, the embodiment of the present disclosure further provides a display device. FIG. 3 is a schematic diagram of another display effect of a display panel according to an embodiment of the present disclosure. Referring to FIG. 3, the processor 30 is further configured to determine, according to the user eyeball image information, the position of the gaze point 1 of the user viewing the display panel, determine, according to the position of the gaze point of the user viewing the display panel, an image unit 2 in a display picture corresponding to the position of the gaze point 1, and set a region where the image unit 2 is located to the gaze region 100.

The image unit 2 is a complete image of a certain object or landscape in the display picture of the display panel, which exists separately from other objects or landscapes in the display picture. Exemplarily, the image unit 2 may be a certain animal, a certain object or a certain scene. When the user views the display picture, it is easy to pay attention to a complete object or landscape, so the complete object or landscape needs to be displayed at the higher resolution. Based on this, after determining the gaze point 1 according to the eyeball image information, the processor 30 may further determine the image unit 2 where the gaze point 1 is located, and regard a region of the image unit 2 on the display panel as the gaze region 100 of the user. When the display panel is controlled and driven to be displayed, a high-resolution display of the image unit 2 may be achieved, and the high-resolution viewing requirement of the user is satisfied.

Figure 4:
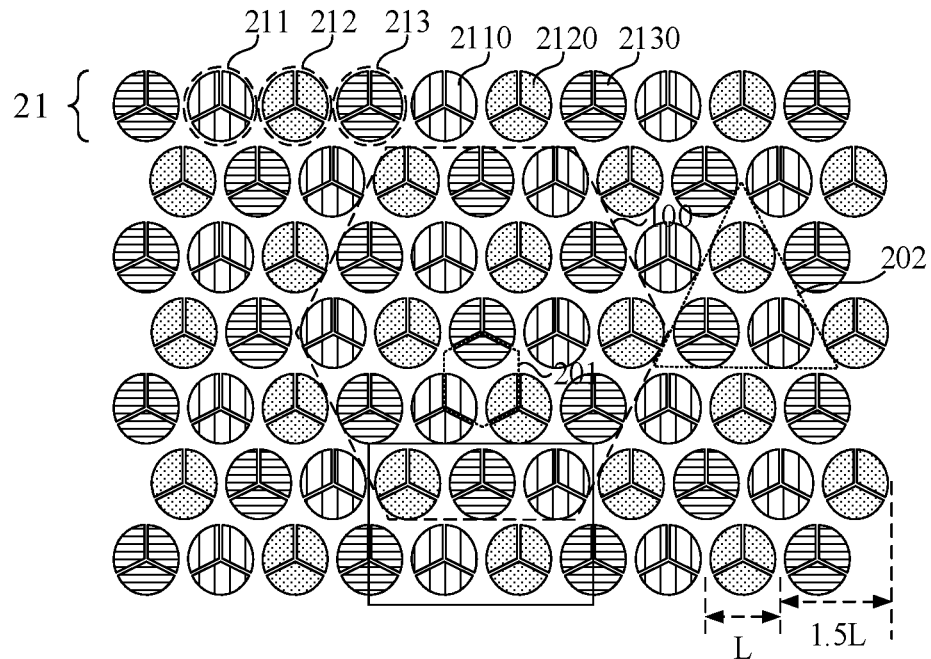
FIG. 4 is a structural diagram of a display panel according to an embodiment of the present disclosure.

It is to be noted that the display panel in the display device provided by the above-mentioned embodiments needs to have a normal-resolution display capability and a high-resolution display capability, and can implement a resolution switching function for a local region. The embodiment of the present disclosure provides a display panel. FIG. 4 is a structural diagram of a display panel in a display device according to an embodiment of the present disclosure. Referring to FIG. 4, the display panel is used as an example to explain a working principle of the display device in the above-mentioned embodiments with region displays at two resolutions below.

The display panel 20 shown in FIG. 4 includes a plurality of pixel rows 21, and each of the plurality of pixel rows 21 includes a first pixel 211, a second pixel 212 and a third pixel 213 which are repeatedly arranged in sequence and have different colors from one another. The first pixel 211 includes three first sub-pixels 2110, the second pixel includes three second sub-pixels 2120, and the third pixel includes three third sub-pixels 2130. Pixels of a same color in an odd row and an even row among the plurality of pixel rows 21 are staggered by a preset width. A first pixel unit 201 displayed at the first resolution includes one first sub-pixel 2110, one second sub-pixel 2120, and one third sub-pixel 2130 which are adjacent to one another and located in two adjacent pixel rows 21. A second pixel unit 202 displayed at the second resolution includes one first pixel 211, one second pixel 212, and one third pixel 213 which are adjacent to one another and located in two adjacent pixel rows.

The first pixel 211, the second pixel 212 and the third pixel 213 have different colors from one another and may be matched with colors to perform a full-color display. Colors of the first pixel 211, the second pixel 212 and the third pixel 213 are generally be set to three primary colors of red, green, and blue. The first pixel 211, the second pixel 212 and the third pixel 213 are repeatedly arranged in sequence, and first pixels 211 in adjacent rows are staggered by the preset width, second pixels 212 in adjacent rows are staggered by the preset width, and third pixels 213 in adjacent rows are staggered by the preset width, which ensures that the first pixel 211 is closest to one second pixel 212 and one third pixel 213 in an adjacent row to form the second pixel unit 202 of three primary colors. Meanwhile, since the first pixel 211, the second pixel 212, and the third pixel 213 each are composed of three sub-pixels, one first sub-pixel 2110 is closest to one second sub-pixel 2120 and one third sub-pixel 2130 in an adjacent row, so as to form the first pixel unit 201 of three primary colors. Apparently, the first pixel unit 201 composed of the first sub-pixel 2110, the second sub-pixel 2120 and the third sub-pixel 2130 is small, and a display region composed of the first pixel units 201 has a higher resolution. The second pixel unit 202 composed of the first pixel 211, the second pixel 212 and the third pixel 213 is large, and a display region composed of the second pixel units 202 has a relatively lower resolution. Therefore, when the display panel is driven, pixels in the gaze region are driven to be displayed by the first pixel unit 201 and pixels in the split vision region are driven to be displayed by the second pixel unit 202, so that the region displays at the two resolutions can be achieved.

Figure 5:
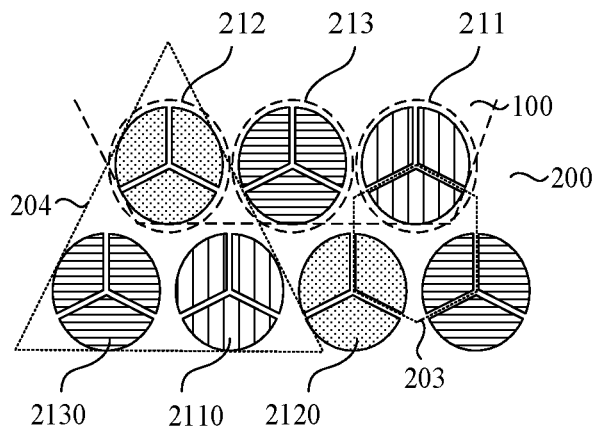
FIG. 5 is a partial enlarged diagram within a solid-lined box of the display panel shown in FIG. 4.

It is to be noted that when the above-mentioned display panel performs displays at two resolutions in the gaze region and the split vision region, pixels at a position of a boundary line between the regions need to be reasonably controlled and driven. Specifically, the display panel further includes a third pixel unit and a fourth pixel unit located on a boundary line between the gaze region and the split vision region. The third pixel unit includes one sub-pixel located on the boundary line between the gaze region and the split vision region and another two sub-pixels which have different colors from the one sub-pixel, where the other two sub-pixels are adjacent to the one sub-pixel and are in a pixel row which is adjacent to a pixel row where the one sub-pixel is located, and the third pixel unit is displayed at the first resolution. The fourth pixel unit includes one pixel located on the boundary line between the gaze region and the split vision region and another two pixels which have different colors from the one pixel, where the other two pixels are adjacent to the one pixel in the split vision region and are in a pixel row which is adjacent to a pixel row where the one pixel is located, and the fourth pixel unit is displayed at the second resolution; or the fourth pixel unit includes two pixels located on the boundary line between the gaze region and the split vision region and another one pixel which has a different color from the two pixel, where the other one pixel is adjacent to the two pixels in the split vision region and is in a pixel row which is adjacent to a pixel row where the two pixels are located, and the fourth pixel unit is displayed at the second resolution. FIG. 5 is a partial enlarged diagram of the display panel shown in FIG. 4 within a solid-line box. Referring to FIG. 4 and FIG. 5, generally, the gaze region 100 is displayed at the higher resolution by a plurality of first pixel units 201, and the split vision region 200 is displayed at the normal resolution by a plurality of second pixel units 202. However, the third pixel unit 203 and the fourth pixel unit 204 located on the boundary line between the gaze region 100 and the split vision region 200 also need to be matched with the three primary colors. That is, the third pixel unit 203 located on the boundary line includes one first sub-pixel 2110, one second sub-pixel 2120 and one third sub-pixel 2130, and any one or two sub-pixels in the third pixel unit 203 may be located in the split vision region 200, and meanwhile, the other two or one sub-pixel is located in the gaze region 100. The fourth pixel unit 204 located on the boundary line includes one first pixel 211, one second pixel 212 and one third pixel 213, and any one or two pixels in the fourth pixel unit 204 may be located in the gaze region 100, and meanwhile, the other two or one pixel is located in the split vision region 200. At this time, the first pixel unit 201 in the gaze region 100 and the third pixel unit 203 located on the boundary line display the picture at the higher resolution, and the second pixel unit 202 in the split vision region 200 and the fourth pixel unit 204 located on the boundary line are displayed at the normal resolution.

It is to be noted that in the above-mentioned display panel, some sub-pixels exist in both the third pixel unit 203 and the fourth pixel unit 204, and in a specific driving process, the sub-pixels may be shared by time-sharing driving.

Furthermore, in the display panel shown in FIG. 4, the first pixel 211, the second pixel 212 and the third pixel 213 may be configured to have a same pixel width L along a row direction, and pixels of the same color in an odd row and the pixels of the same color in an even row which are adjacent to each other are staggered by 1.5 pixel widths. In this case, the first pixel 211, the second pixel 212 and the third pixel 213 which are located in adjacent rows and adjacent to one another are arranged in a triangle, and the first sub-pixel 2110, the second sub-pixel 2120 and the third sub-pixel 2130 which are located in adjacent rows and adjacent to one another are also arranged in a triangle. At this time, the second pixel unit 202 and the first pixel unit 201 are matched with colors more uniformly and have the better display effect.

Figure 6:
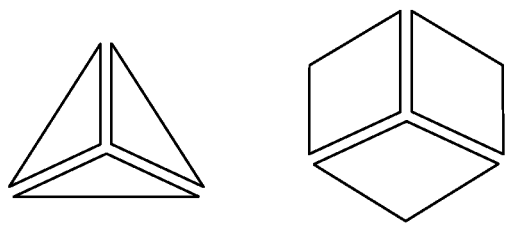
FIG. 6 is a schematic diagram of two shapes of pixels according to an embodiment of the present disclosure.

Still referring to FIG. 4 and FIG. 5, the first pixel 211, the second pixel 212 and the third pixel 213 in the display panel are circles, and each pixel is composed of three sector-shaped sub-pixels. In addition, the first pixel, the second pixel and the third pixel in the display panel may further be configured as regular polygons, for example, triangles or hexagons. FIG. 6 is a schematic diagram of two pixel shapes according to an embodiment of the present disclosure. Referring to FIG. 6, when the pixel is configured as the triangle, the corresponding sub-pixels are three isosceles triangles with a vertex angle of 120°; and when the pixel is configured as the hexagon, the corresponding sub-pixels are rhombuses.

On the basis of the above-mentioned embodiments, in order to avoid a difference in resolution between a left region and a right region when the user observes the image with the eyes, preferably, the processor controls the gaze region to be a centrosymmetric graphic or an axisymmetric graphic when controlling the gaze region to be displayed at the first resolution. Still referring to FIG. 4, the gaze region 100 is a regular hexagon, that is, the centrosymmetric graphic. At this time, the gaze region 100 displayed at the higher resolution and viewed by the user is central symmetrical around the gaze point of the user, and no difference occurs in resolution between the left region and the right region, which satisfies the high-resolution viewing requirement of the user.

Furthermore, when the gaze region is the centrosymmetric graphic, the gaze region should satisfies the following condition: $\min(M_x/2, M_y/2) \times 0.5\% < N < \min(M_x/2, M_y/2)$, where a min(a, b) function denotes a function taking minimum values of a and b, $M_x$ denotes a total number of pixels of the display panel in a row direction, $M_y$ denotes a total number of pixels of the display panel in a column direction, and N denotes a number of pixels from an edge to a symmetric center of the gaze region. At this time, a length from the edge to the center of the gaze region is 0.5%-100% of half of a length of a short side of the display panel. For example, the display panel is the rectangle and the gaze region is the circle. A diameter of the gaze region is 0.5%-100% of a width of the display panel. When the display panel is displayed, the circular gaze region is displayed at the higher resolution and has a suitable display area, which can satisfy the high-resolution viewing requirement of the user.

Figure 7:
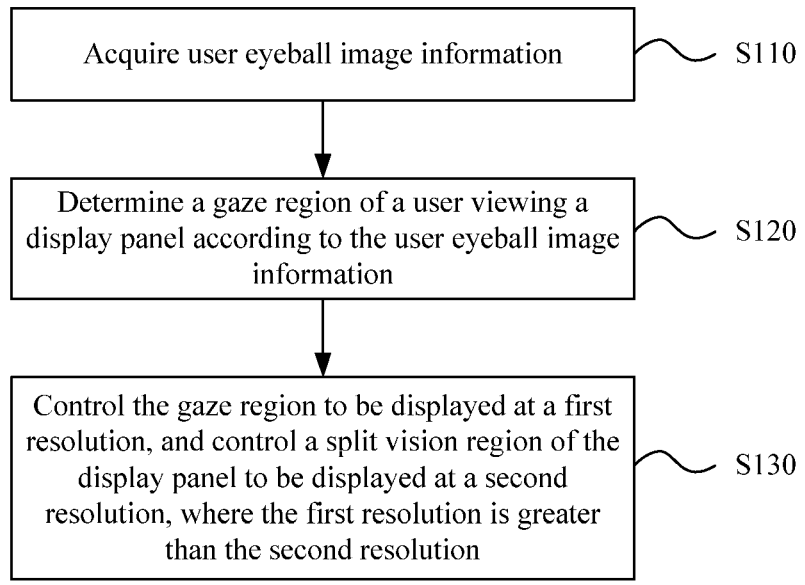
FIG. 7 is a flowchart of a display driving method for a display panel according to an embodiment of the present disclosure.

Embodiments of the present disclosure further provide a display driving method for a display panel. FIG. 7 is a flowchart of a display driving method for a display panel according to an embodiment of the present disclosure. Referring to FIG. 1, FIG. 2 and FIG. 7, the display driving method for the display panel includes steps described below.

In S110, user eyeball image information is acquired.

This step is performed by an eyeball tracking inductor 10 in essence, and a processor 30 is configured to receive the eyeball image information collected by the eyeball tracking inductor 10. The user eyeball image information mainly includes eyeball movement position information to represent a direction of a line of sight or a position of a point of sight of a user.

In S120, a gaze region of the user viewing the display panel is determined according to the user eyeball image information.

A determination rule needs to be preset for a process of determining the gaze region, where the gaze region refers to a region where the user focuses attention or a region where the line of sight falls when the user views the display panel 20. After a direction of the line of sight or the position of the point of sight is known, the region where the user focuses the attention may be calculated according to the preset determination rule.

In S130, the gaze region is controlled to be displayed at a first resolution, and a split vision region of the display panel is controlled to be displayed at a second resolution, where the first resolution is greater than the second resolution.

The processor 30 not only performs step S120 of determining the gaze region but also needs to drive and control the display panel 20 to enable the display panel to display an image. Specifically, the region where the user focuses the attention is displayed at the first resolution, that is, a higher resolution, and a region other than the gaze region is displayed at the second resolution, that is, a normal resolution.

In the display driving method for the display panel provided by the embodiment of the present disclosure, the user eyeball image information is acquired, the gaze region of the user viewing the display panel is determined according to the user eyeball image information, the gaze region is controlled to be displayed at the first resolution, and the split vision region of the display panel is controlled to be displayed at the second resolution, where the first resolution is greater than the second resolution. In this way, the problems that a resolution of an existing display device is not high enough and that power consumption and calculation energy are large when a high-resolution display panel is used are solved, a high-resolution display of the gaze region viewed by the user is achieved, a display effect is improved, a high-resolution viewing requirement of the user is satisfied, and meanwhile the power consumption and the calculation energy of the whole display panel are reduced and costs are saved.

Figure 8:
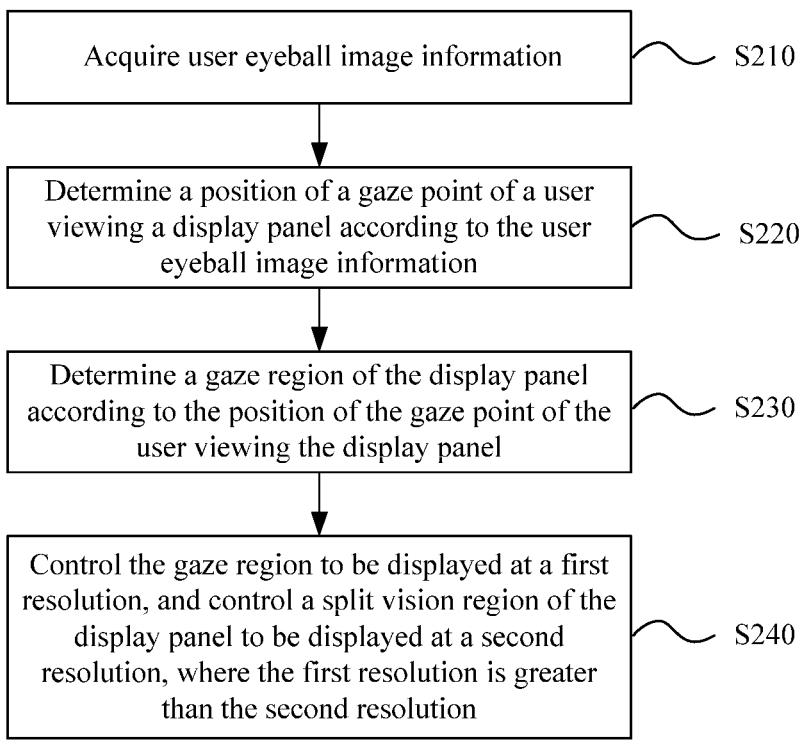
FIG. 8 is a flowchart of another display driving method for a display panel according to an embodiment of the present disclosure.

For step S120 in which the gaze region of the user viewing the display panel is determined according to the user eyeball image information, the embodiment of the present disclosure provides two specific implementation modes. FIG. 8 is a flowchart of another display driving method for a display panel according to an embodiment of the present disclosure. Referring to FIG. 1, FIG. 2 and FIG. 8, the driving method for the display panel includes steps described below.

In S210, the user eyeball image information is acquired.

In S220, the position of the gaze point of the user viewing the display panel is determined according to the user eyeball image information.

A point of the display panel at which the line of sight of the user's eyeballs falls, that is, the position of the gaze point, may be calculated according to the user eyeball image information and a geometric structure of the display device. The position of the gaze point is a position of most concentrated attention.

In S230, the gaze region of the display panel is determined according to the position of the gaze point of the user viewing the display panel.

In this step, parameters such as a shape and a size of the gaze region need to preset, so as to acquire the gaze region in a case where the position of the gaze point is determined. Setting the gaze region of the display panel according to the gaze point can more accurately set the region where the user focuses the attention and avoid a deviation.

In S240, the gaze region is controlled to be displayed at the first resolution, and the split vision region of the display panel is controlled to be displayed at the second resolution, where the first resolution is greater than the second resolution.

Step S230 in which the gaze region of the display panel is determined according to the position of the gaze point of the user viewing the display panel includes steps described below.

In S231, a setting parameters of the gaze region is acquired.

The setting parameters of the gaze region is provided by the user and may include the parameters such as the shape and the size of the gaze region.

In S232, a position, the shape and the size of the gaze region are determined according to the position of the gaze point of the user viewing the display panel and the setting parameters of the gaze region.

In a case where the position of the gaze point is determined in step S230, the parameters such as the shape and the size of the gaze region are determined according to the setting parameters of the gaze region set by the user, which can better satisfy the high-resolution viewing requirement of the user and provide the user with a better viewing experience.

Figure 9:
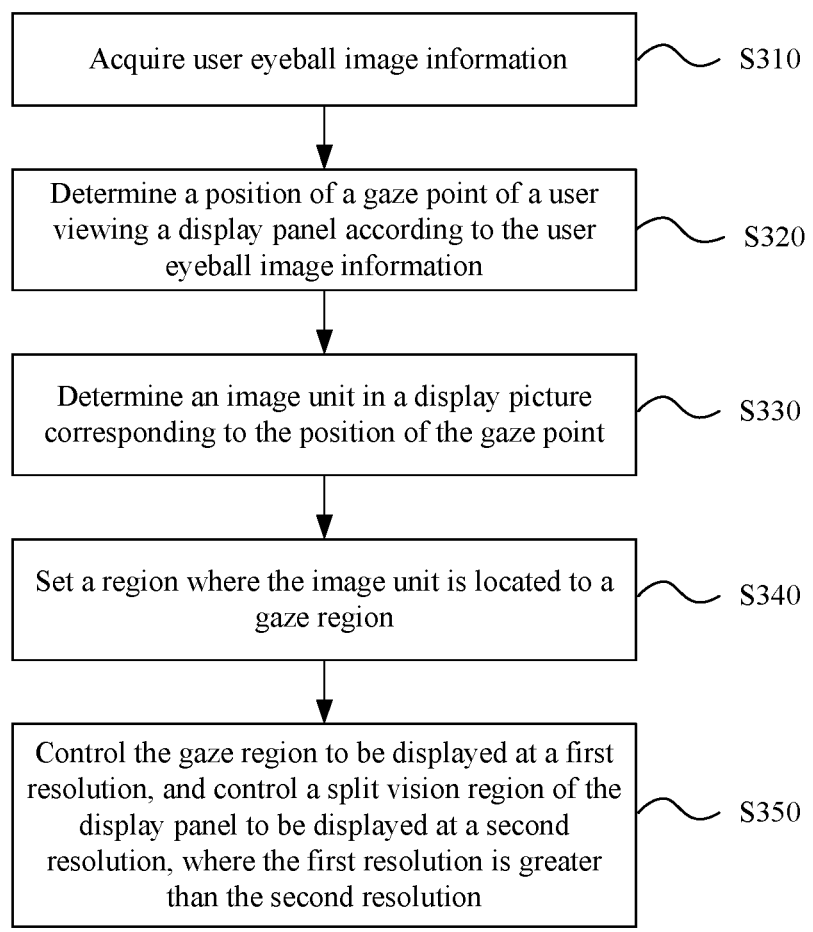
FIG. 9 is a flowchart of another display driving method for a display panel according to an embodiment of the present disclosure.

FIG. 9 is a flowchart of another display driving method for a display panel according to an embodiment of the present disclosure. Referring to FIG. 1, FIG. 3 and FIG. 9, the driving method for the display panel includes steps described below.

In S310, the user eyeball image information is acquired.

In S320, the position of the gaze point of the user viewing the display panel is determined according to the user eyeball image information.

In S330, an image unit in a display picture corresponding to the position of the gaze point is determined.

The image unit is a complete image of a certain object or landscape in the display picture of the display panel, which exists separately from other objects or landscapes in the display picture. Exemplarily, the image unit may be a certain animal, a certain object or a certain scene.

In S340, a region where the image unit is located is set to the gaze region.

In S350, the gaze region is controlled to be displayed at the first resolution, and the split vision region of the display panel is controlled to be displayed at the second resolution, where the first resolution is greater than the second resolution.

At this time, the processor controls and drives the display panel to display the image unit on which the user focuses the attention more easily at the higher resolution, thereby satisfying the higher resolution viewing requirement of the user.

Figure 10:
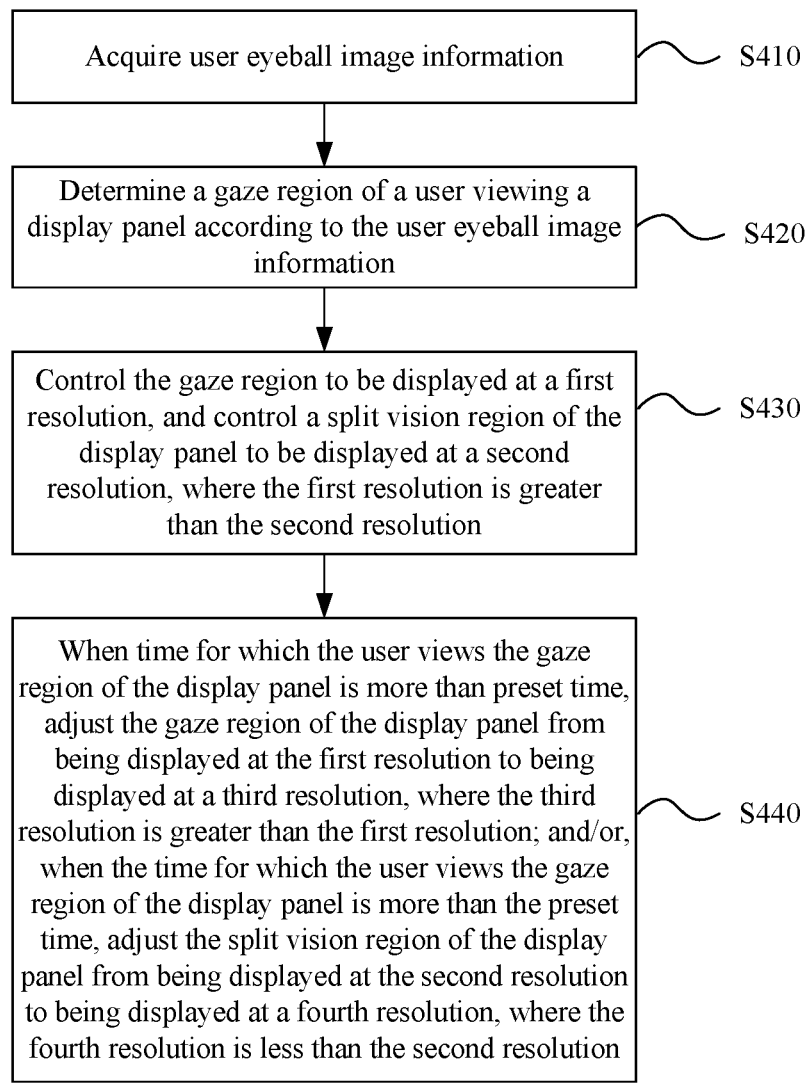
FIG. 10 is a flowchart of another driving method for a display panel according to an embodiment of the present disclosure.

On the basis of the display device and the driving method for the display panel provided by the above-mentioned embodiments, furthermore, considering that the user is particularly interested in some regions of the image when viewing the image, which is embodied by that the line of sight of the user stays on the gaze region for a long time. For a region of the image that the user is particularly interested in, the embodiment of the present disclosure further provides a driving method for the display panel. FIG. 10 is a flowchart of another driving method for a display panel according to an embodiment of the present disclosure. Referring to FIG. 1, FIG. 2 and FIG. 10, the driving method for the display panel includes steps described below.

In S410, the user eyeball image information is acquired.

In S420, the gaze region of the user viewing the display panel is determined according to the user eyeball image information.

In S430, the gaze region is controlled to be displayed at the first resolution, and the split vision region of the display panel is controlled to be displayed at the second resolution, where the first resolution is greater than the second resolution.

In S440, when time for which the user views the gaze region of the display panel is more than preset time, the gaze region of the display panel is adjusted from being displayed at the first resolution to being displayed at a third resolution, where the third resolution is greater than the first resolution; and/or, when the time for which the user views the gaze region of the display panel is more than the preset time, the split vision region of the display panel is adjusted from being displayed at the second resolution to being displayed at a fourth resolution, where the fourth resolution is less than the second resolution.

In this step, it is necessary to record time for which the user eyeball image information remains unchanged, or to record time for which the determined gaze region remains unchanged, so as to determine that time for which the line of sight of the user stays on the gaze region exceeds the preset time; therefore, it may be determined that the user is particularly interested in the gaze region. Based on this, the processor controls and drives the gaze region to be displayed at a higher resolution, that is, the third resolution, so that the user is provided with a higher-resolution viewing experience. Meanwhile, the split vision region which the user is relatively uninterested in is displayed at a lower resolution, that is, the fourth resolution, thereby reducing the power consumption and the calculation energy of the whole display panel. It is be noted that this step is essentially to further switch resolution levels of some regions of the display panel, so the display panel is required to have the capability of switching among four resolution levels. On the basis of the display panel and the driving method provided by the embodiments of the present disclosure, the display panel may be reasonably designed and selected by those skilled in the art, for example, a mode for further dividing sub-pixels or sharing sub-pixels is used to improve the resolution such that the display panel has the capability of switching among four resolution levels, which will not be described here in detail.

It is to be noted that the above are merely preferred embodiments of the present disclosure and the technical principles used therein. It will be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may further include more other equivalent embodiments without departing from the concept of the present disclosure. The scope of the present disclosure is determined by the scope of the appended claims.

What is claimed is:

1. A display device, comprising:
an eyeball tracking inductor;
a display panel; and
a processor, wherein the processor is electrically connected to the eyeball tracking inductor and the display panel separately; wherein
the eyeball tracking inductor is configured to identify eyeball image information of a user viewing the display panel;
the processor is configured to determine a gaze region of the user viewing the display panel according to the eyeball image information, control the gaze region to be displayed at a first resolution, and control a split vision region of the display panel to be displayed at a second resolution;
the first resolution is greater than the second resolution; and
the gaze region is a centrosymmetric graphic and satisfies a following condition: $\min(M_x/2, M_y/2)/0.5\% < N < \min(M_x/2, M_y/2)$; wherein a min(a,b) function denotes a function taking a minimum value of a and b, $M_x$ denotes a total number of pixels of the display panel in a row direction, $M_y$ denotes a total number of pixels of the display panel in a column direction, and N denotes a number of pixels from an edge to a symmetric center of the gaze region.

2. The display device of claim 1, wherein the processor is further configured to determine, according to the user eyeball image information, a position of a gaze point of the user viewing the display panel, and determine, according to the position of the gaze point of the user viewing the display panel, the gaze region of the display panel; and wherein the position of the gaze point of the user viewing the display panel is a center of the gaze region.

3. The display device of claim 2, wherein the processor is further configured to acquire setting parameters of the gaze region, and determine a shape and a size of the gaze region, according to the position of the gaze point of the user viewing the display panel and the setting parameters of the gaze region.

4. The display device of claim 1, wherein the processor is further configured to determine a position of a gaze point of the user viewing the display panel, according to the user eyeball image information, to determine an image unit in a display picture corresponding to the position of the gaze point, according to the position of the gaze point of the user viewing the display panel, and to set a region where the image unit is located to the gaze region.

5. The display device of claim 1, wherein the display panel comprises a plurality of pixel rows, wherein each of the plurality of pixel rows comprises a first pixel, a second pixel and a third pixel which are repeatedly arranged in sequence and have different colors from one another; wherein the first pixel comprises three first sub-pixels, the second pixel comprises three second sub-pixels, and the third pixel comprises three third sub-pixels; and wherein pixels of a same color in an odd row and pixels of the same color in an even row among the plurality of pixel rows are staggered by a preset width;
wherein a first pixel unit displayed at the first resolution comprises one first sub-pixel, one second sub-pixel, and one third sub-pixel which are adjacent to one another and located in two adjacent pixel rows; and
wherein a second pixel unit displayed at the second resolution comprises one first pixel, one second pixel, and one third pixel which are adjacent to one another and located in two adjacent pixel rows.

6. The display device of claim 5, wherein the first pixel, the second pixel and the third pixel have a same pixel width along a row direction, and pixels of a same color in two adjacent pixel rows are staggered by 1.5 pixel widths.

7. The display device of claim 5, wherein each of the first pixel, the second pixel and the third pixel is of a regular polygon or a circle.

8. The display device of claim 5, wherein the display panel further comprises a third pixel unit and a fourth pixel unit located on a boundary line between the gaze region and the split vision region;

wherein the third pixel unit comprises:
one sub-pixel located on the boundary line between the gaze region and the split vision region and another two sub-pixels which have different colors from the one sub-pixel, wherein the other two sub-pixels are adjacent to the one sub-pixel and are in a pixel row which is adjacent to a pixel row where the one sub-pixel is located, wherein the third pixel unit is displayed at the first resolution; and wherein the fourth pixel unit comprises:
one pixel located on the boundary line between the gaze region and the split vision region and another two pixels which have different colors from the one pixel, wherein the other two pixels are adjacent to the one pixel in the split vision region and are in a pixel row which is adjacent to a pixel row where the one pixel is located, and the fourth pixel unit is displayed at the second resolution; or two pixels located on the boundary line between the gaze region and the split vision region and another one pixel which has a different color from the two pixel, wherein the other one pixel is adjacent to the two pixels in the split vision region and is in a pixel row which is adjacent to a pixel row where the two pixels are located; wherein the fourth pixel unit is displayed at the second resolution.

9. A display driving method for a display panel, comprising:

acquiring eyeball image information of a user viewing the display panel;

determining a gaze region of the user viewing the display panel according to the eyeball image information; and controlling the gaze region to be displayed at a first resolution, and controlling a split vision region of the display panel to be displayed at a second resolution; wherein the first resolution is greater than the second resolution; and the gaze region is a centrosymmetric graphic and satisfies a following condition: $\min(M_x/2, M_y/2) \times 0.5\% < N < \min(M_x/2, M_y/2)$; wherein a $\min(a,b)$ function denotes a function taking a minimum value of a and b, $M_x$ denotes a total number of pixels of the display panel in a row direction, $M_y$ denotes a total number of pixels of the display panel in a column direction, and N denotes a number of pixels from an edge to a symmetric center of the gaze region.

10. The display driving method for a display panel of claim 9, wherein determining the gaze region of the user viewing the display panel according to the user eyeball image information, comprises:

determining a position of a gaze point of the user viewing the display panel, according to the user eyeball image information; and determining the gaze region of the display panel, according to the position of the gaze point of the user viewing the display panel.

11. The display driving method for a display panel of claim 10, wherein determining the gaze region of the display panel according to the position of the gaze point of the user viewing the display panel comprises:

acquiring setting parameters of the gaze region; and determining a position, a shape and a size of the gaze region, according to the position of the gaze point of the user viewing the display panel and the setting parameters of the gaze region.

12. The display driving method for a display panel of claim 10, wherein determining the gaze region of the display panel according to the position of the gaze point of the user viewing the display panel comprises:

determining an image unit in a display picture corresponding to the position of the gaze point; and setting a region where the image unit is located in the gaze region.

13. The display driving method for a display panel of claim 9, further comprising:

when a time during which the user views the gaze region of the display panel is more than a predetermined time, adjusting the gaze region of the display panel from being displayed at the first resolution to being displayed at a third resolution, wherein the third resolution is greater than the first resolution; or when the time during which the user views the gaze region of the display panel is more than the predetermined time, adjusting the split vision region of the display panel from being displayed at the second resolution to being displayed at a fourth resolution, wherein the fourth resolution is less than the second resolution.

14. The display driving method for a display panel of claim 9, further comprising:

when a time duringe gaze region of the display panel is more than a predetermined time, adjusting the gaze region of the display panel from being displayed at the first resolution to being displayed at a third resolution, wherein the third resolution is greater than the first resolution; and when the time during which the user views the gaze region of the display panel is more than the predetermined time, adjusting the split vision region of the display panel from being displayed at the second resolution to being displayed at a fourth resolution, wherein the fourth resolution is less than the second resolution.

* * * * *